US012695293B2

(12) United States Patent
Tannhäuser et al.

(10) Patent No.: US 12,695,293 B2
(45) Date of Patent: Jul. 28, 2026

(54) CIRCUIT-BREAKER DEVICE AND METHOD

(71) Applicant: Siemens Aktiengesellschaft, Munich (DE)

(72) Inventors: Marvin Tannhäuser, Hausen (DE);
Dominic Malane, Eichstätt (DE);
Fabian Döbler, Theilenhofen (DE)

(73) Assignee: Siemens Aktiengesellschaft, Munich (DE)

( * ) Notice: Subject to any disclaimer, the term of this patent is extended or adjusted under 35 U.S.C. 154(b) by 483 days.

(21) Appl. No.: 18/258,604

(22) PCT Filed: Dec. 21, 2021

(86) PCT No.: PCT/EP2021/087105

§ 371 (c)(1),
(2) Date: Jun. 21, 2023

(87) PCT Pub. No.: WO2022/136443

PCT Pub. Date: Jun. 30, 2022

(65) Prior Publication Data

US 2024/0047962 A1     Feb. 8, 2024

(30) Foreign Application Priority Data

Dec. 21, 2020   (DE) ..................... 10 2020 216 416.9
Dec. 20, 2021   (EP) ..................... 21216150

(51) Int. Cl.
*H02H 5/04*          (2006.01)
*H01H 9/54*          (2006.01)
(Continued)

(52) U.S. Cl.
CPC ............ *H02H 5/041* (2013.01); *H01H 9/548* (2013.01); *H02H 3/05* (2013.01); *H02H 3/38* (2013.01)

(58) Field of Classification Search
CPC ............ H02H 3/38; H02H 5/041; H02H 6/00; H02H 6/005; H02H 5/04; H02H 9/02
See application file for complete search history.

(56) References Cited

U.S. PATENT DOCUMENTS 11,037,749 B2 *   6/2021   Kouroussis ............ H02H 3/025
11,217,412 B2     1/2022   Haslinger
(Continued)

FOREIGN PATENT DOCUMENTS

DE        102007006564 A1     8/2008
DE        202009014759 U1     3/2010
(Continued)

*Primary Examiner* — Thienvu V Tran
*Assistant Examiner* — Christopher J Clark
(74) *Attorney, Agent, or Firm* — Laurence A. Greenberg; Werner H. Stemer; Ralph E. Locher

(57) ABSTRACT

A circuit breaker device for protecting a low-voltage electric circuit includes a mechanical break contact unit connected in series with an electronic interruption unit. The break contact unit is switchable by opening contacts to prevent current flow or by closing the contacts to allow current flow in the low-voltage circuit. The electronic interruption unit is switchable by semiconductor-based switching elements into a high-resistance state of the switching elements to prevent current flow or into a low-resistance state of the switching elements to allow current flow in the low-voltage circuit. The amplitude of the current in the low-voltage circuit is ascertained to provide instantaneous current values which are compared with at least one current threshold value, and if the threshold value is exceeded, prevention of current flowing in the low-voltage circuit is initiated. The at least one current threshold value is adjusted according to a temperature level of the circuit breaker device.

28 Claims, 6 Drawing Sheets

(51) Int. Cl.
    *H02H 3/05*          (2006.01)
    *H02H 3/38*          (2006.01)

(56)            References Cited

U.S. PATENT DOCUMENTS

| | | | |
|---|---|---|---|
| 11,979,015 | B2 | 5/2024 | Erven |
| 2009/0198459 | A1 | 8/2009 | Bilac et al. |
| 2016/0190792 | A1* | 6/2016 | Kellogg ............. G01R 19/0092 |
| | | | 361/87 |
| 2017/0004948 | A1 | 1/2017 | Leyh |
| 2018/0261996 | A1* | 9/2018 | Kikuchi ................... H02H 3/08 |
| 2020/0365346 | A1* | 11/2020 | Telefus ................. H02M 1/083 |
| 2024/0399981 | A1* | 12/2024 | Nakano ............... B60R 16/0207 |

FOREIGN PATENT DOCUMENTS

| | | | |
|---|---|---|---|
| DE | 102016123955 | A1 | 6/2018 |
| DE | 102019213604 | A1 | 3/2021 |
| DE | 102020216396 | B3 | 5/2022 |
| DE | 102020216397 | B3 | 5/2022 |
| DE | 102020216413 | A1 | 6/2022 |
| DE | 102020216416 | A1 | 6/2022 |
| EP | 3700038 | A1 | 8/2020 |
| WO | WO 2020169753 | A1 | 8/2020 |
| WO | WO 2020169765 | A1 | 8/2020 |
| WO | WO 2020169773 | A1 | 8/2020 |
| WO | WO 2020169774 | A1 | 8/2020 |
| WO | WO 2020169780 | A1 | 8/2020 |

* cited by examiner

CIRCUIT-BREAKER DEVICE AND METHOD

FIELD AND BACKGROUND OF THE INVENTION

The invention relates to the technical field of a circuit-breaker device for a low-voltage circuit having an electronic interruption unit, and to a method for a circuit-breaker device for a low-voltage circuit having an electronic interruption unit.

The term low-voltage describes voltages of up to 1,000 VC or up to 1,500 V DC. In particular, the term low-voltage describes voltages which are greater than the extra-low voltage, with values of 50 V AC or 120 V DC.

The term low-voltage circuit, or grid, or installation describes circuits with nominal currents or rated currents of up to 125 amperes, specifically up to 63 amperes. The term low-voltage circuit particularly describes circuits having nominal currents or rated currents of up to 50 amperes, 40 amperes, 32 amperes, 25 amperes, 16 amperes or 10 amperes. The above-mentioned current values particularly describe nominal, rated and/or breaking currents, i.e. the maximum current which is conducted by the circuit under normal circumstances, or at which the electric circuit is customarily interrupted, for example by a protective device such as a circuit-breaker device, a line circuit-breaker or a power breaker.

Line circuit-breakers are well-known overcurrent protection devices, which are employed in low-voltage circuits of electrotechnical installations. These protect lines against damage associated with heat-up resulting from an excessively high current and/or a short-circuit. A line circuit-breaker can interrupt a circuit automatically in the event of an overload and/or a short-circuit. A line circuit-breaker is a non-auto-resetting protective device. Power breakers, conversely to line circuit-breakers, are designed for currents greater than 125 A, in some cases for currents in excess of 63 amperes. Consequently, line circuit-breakers are configured with a simpler and slenderer design. Line circuit-breakers customarily comprise a fastening option for fastening to a "top-hat rail" (mounting rail, DIN rail, TH35).

Line circuit-breakers are electromechanically structured. In a housing, they comprise a mechanical switching contact or open-circuit trip element for the interruption (tripping) of electric current. A bimetallic protection element or bimetallic element is customarily employed for tripping (interruption) in the event of a sustained overcurrent (overcurrent protection) or in the event of a thermal overload (overload protection). An electromagnetic trip element with a coil is employed for short-time tripping in the event of an overshoot of an overcurrent limiting value or in the event of a short-circuit (short-circuit protection). One or more arc-quenching chamber(s) or arc-quenching devices are provided. Connecting elements are further provided for lines of the electric circuit which are to be protected.

Circuit-breaker devices having an electronic interruption unit are a relatively novel development. These comprise a semiconductor-based electronic interruption unit. This means that the electric current flux in the low-voltage circuit is conducted via semiconductor elements or semiconductor switches, which can interrupt the electric current flux or which can be switched to a conducting state. In many cases, circuit-breaker devices having an electronic interruption unit further comprise a mechanical break contact system, particularly having breaking properties which are consistent with applicable standards for low-voltage circuits, wherein the contacts of the mechanical break contact system are connected in series with the electronic interruption unit, such that the current in the low-voltage circuit to be protected is routed via the mechanical break contact system and via the electronic interruption unit.

In semiconductor-based circuit-breaker devices or protective devices, now described as solid state circuit-breakers, or SSCB for short, it is necessary for switching energy to be converted, not into an arc, as per a mechanical switching device, but into heat, by means of an additional circuit or energy absorber. Breaking energy thus comprises energy which is stored in the circuit, i.e. in network, line or load-circuit impedances (load impedances). In order to relieve the load on the energy absorber, the current flowing at the time of breaking must be as low as possible. The same applies in the event of a short-circuit. In this case, the current rises very rapidly. By means of rapid short-circuit protection, a short-circuit can be detected promptly, and an excessively high short-circuit current can be prevented. In a breaking process, the semiconductor-based short-circuit device interrupts the circuit with virtually no delay, with a margin of $\mu s$. No high currents occur, and the loading of the energy absorber of a semiconductor-based circuit-breaker device is reduced. Known short-circuit detection functions or breaking criteria are customarily based upon the determination and evaluation of the actual current value.

The present invention relates to a low-voltage AC circuit having an AC voltage, customarily having a time-dependent sinusoidal AC voltage of frequency f, typically 50 or 60 Hertz (Hz). The temporal dependence of the instantaneous voltage value u(t) of the AC voltage is given by the equation:

$$u(t)=U^*\sin(2\pi f^*t)$$

where:

u(t)=the instantaneous voltage value at time t

U=the amplitude (maximum value) of voltage

A harmonic AC voltage can be represented by the rotation of a pointer, the length of which corresponds to the amplitude (U) of the voltage. Instantaneous displacement is represented by the projection of the pointer onto a coordinate system. An oscillation period corresponds to one full rotation of the pointer, and the full angle thereof is $2\pi$ (2pi) or 360°. The angular frequency is the rate of variation of the phase angle of this rotating pointer. The angular frequency of a harmonic oscillation is always $2\pi$-times the frequency thereof, such that:

$$\omega=2n^*f=2\pi/T=\text{angular frequency of AC voltage}$$

(T=period of oscillation).

In many cases, angular frequency ($\overline{\omega}$) is preferred as a variable over frequency (f), as many formulae in oscillation theory, given the occurrence of trigonometric functions, the period of which, by definition, is $2\pi$, can be represented more compactly on the basis of angular frequency:

$$u(t)=U^*\sin(\omega t)$$

In the case of temporally non-constant angular frequencies, the concept of instantaneous angular frequency is also employed.

In a sinusoidal, particularly a temporally constant AC voltage, the time-dependent value given by the angular speed $\omega$ and time t corresponds to the time-dependent angle $\omega(t)$, which is also described as the phase angle $\omega(t)$. This means that the phase angle $\omega(t)$ periodically describes a range of $0 \ldots 2\pi$, or $0° \ldots 360°$. This means that the phase angle periodically assumes a value between 0 and $2\pi$, or between 0° and 360° ($\varphi=n^*$ ($0 \ldots 2\pi$) or $\varphi=n^*(0° \ldots 360°)$), on the grounds of periodicity; in short: $\varphi=0 \ldots 2\pi$ or $\varphi=0° \ldots 360°$).

The instantaneous voltage value u(t) therefore describes the instantaneous value of the voltage at a time point t, i.e. in a sinusoidal (periodic) AC voltage, the voltage value at a phase angle $\varphi$ ($\varphi=0$ . . . $2\pi$ or $\varphi=0°$ . . . $360°$, for the respective period).

SUMMARY OF THE INVENTION

The object of the present invention is the improvement of a circuit-breaker device of the above-mentioned type, and particularly the disclosure of an option wherein, in the event of the occurrence of a short-circuit or an overcurrent, i.e. upon the overshoot of at least one current threshold value, the electronic interruption unit executes the secure prevention of any electric current flux.

This object is fulfilled by a circuit-breaker device having the features described below, and by a method having the steps described below.

According to the invention, an (electronic) circuit-breaker device is provided for protecting a low-voltage circuit, particularly a low-voltage AC circuit, comprising:

a housing, having first, particularly grid-side, and second, particularly load-side terminals for conductors of the low-voltage AC circuit, a mechanical break contact unit, which is connected in series with an electronic interruption unit wherein, in particular, the mechanical break contact unit is assigned to the (second) load-side terminals, and the electronic interruption unit is assigned to the (first) grid-side terminals, wherein the mechanical break contact unit is switchable, by the opening of contacts, for the interruption of a current flux or, by the closing of contacts, for the conduction of a current flux in the low-voltage circuit, wherein the electronic interruption unit, by means of semiconductor-based switching elements, is switchable to a high-resistance state of the switching elements, for the prevention of a current flux, or to a low-resistance state of the switching elements, for the allowance of a current flux in the low-voltage circuit, a current sensor unit for determining the level of current in the low-voltage circuit, such that instantaneous current values are provided, a control unit, which is connected to the current sensor unit, the mechanical break contact unit and electronic interruption unit wherein, in the event of an overshoot of at least one current threshold value, a prevention of a current flux in the low-voltage circuit is initiated, wherein the circuit-breaker device is configured such that the at least one current threshold value is adjusted according to a temperature level of the circuit-breaker device.

This provides a particular advantage, in that the circuit-breaker device, in the event of the occurrence of an overcurrent or short-circuit, can securely prevent i.e. interrupt the latter, particularly by means of the electronic interruption unit. In this context, the term securely signifies that the semiconductor-based switching elements (e.g. power semiconductors) are protected against thermal destruction. The breaking capacity of the electronic interruption unit, particularly of the (power) semiconductors thereof), is limited by the (current) operating temperature, particularly by the quantity of heat generated at high currents, particularly in the event of a short-circuit, which might result in thermal overloading. In order to ensure the achievement of secure interruption (in the event of an overshoot of at least one current threshold value), with no associated over-dimensioning of the electronic interruption unit, particularly of the (power) semiconductors thereof, the level of the at least one current threshold value is adapted according to the temperature level of the circuit-breaker device, particularly of specific units of the circuit-breaker device. Thus, according to the invention, a high efficiency and a high degree of economic benefit can be achieved by means of simple units.

Advantageous configurations of the invention are disclosed in the sub-claims.

In an advantageous configuration of the invention, the circuit-breaker device is configured such that the at least one current threshold value is adapted to the temperature level, to the effect that, as the temperature rises, the at least one current threshold value is reduced and, as the temperature falls, the at least one current threshold value is increased, particularly up to a maximum value of the at least one current threshold value.

Advantageously, at high temperatures, the current threshold is reduced, in order to permit the maximum exploitation of the current-carrying capacity or thermal capacity, particularly of the electronic interruption unit, and specifically of the (power) semiconductors thereof.

In an advantageous configuration of the invention, the circuit-breaker device is configured such that the temperature level of the circuit-breaker device is the temperature level within the housing of the circuit-breaker device.

This provides the particular advantage of a simple solution, given that circuit-breaker devices are generally of a compact design, and the temperature level in the circuit-breaker device, i.e. in the space which is enclosed by the housing, permits conclusions to be drawn with respect to the temperature of units contained therein.

In an advantageous configuration of the invention, the circuit-breaker device is configured such that the temperature level of the circuit-breaker device is the temperature level of the electronic interruption unit.

This provides a particular advantage, in that it permits the maximum exploitation, particularly of the thermal capacity of the electronic interruption unit, which is intended, for example, to execute the primary breaking process (current flux interruption).

In an advantageous configuration of the invention, the circuit-breaker device is configured such that the temperature of the circuit-breaker device is the temperature of a (power) semiconductor of the electronic interruption unit.

This provides a particular advantage, in that it permits the maximum exploitation, particularly of the thermal capacity of the current-carrying (power) semiconductor, thereby avoiding any over-dimensioning, and ensuring a high level of economic capacity utilization.

In an advantageous configuration of the invention, at least one temperature sensor unit is provided in the circuit-breaker device, which is connected to the control unit, in order to determine the temperature level.

This provides a particular advantage, in that a simple temperature determination function is provided.

In an advantageous configuration of the invention, the circuit-breaker device is configured such that temperature level is determined or calculated from the level of the measured current.

This provides a particular advantage, in that an alternative option is provided for determining the temperature level, without the involvement of a temperature sensor unit. The temperature level in the circuit-breaker device is essentially determined by the level of the low-voltage circuit current flowing in the circuit-breaker device. A simple, low-cost variant can thus be achieved.

In an advantageous configuration of the invention, the circuit-breaker device is configured such that the temperature level is determined from the level of the measured current, to the effect that a calculation involving an electrical model and a thermal model is executed in consideration of the level of the instantaneous current value.

In an advantageous configuration of the invention, the circuit-breaker device is configured such that the temperature level is determined by means of a temperature sensor which is incorporated in the device, and from the temperature which is detected thereby, to the effect that a calculation involving an electrical model and a thermal model is executed in consideration of the level of the instantaneous current value.

In an advantageous configuration of the invention, the circuit-breaker device is configured such that a continuous adaptation of the at least one current limiting value is executed. Moreover, in particular, an adaptation is executed within a time of less than 20 ms, specifically within a time of less than 10 ms, or preferably within a time of less than 1 ms.

This provides a particular advantage, in that a rapid entrainment of the current threshold value is executed, thus permitting the maximum exploitation of the electronic interruption unit, particularly of the (power) semiconductors thereof, such that a high level of economic capacity utilization can be achieved.

In an advantageous configuration of the invention, the circuit-breaker device is configured such that the instantaneous current value of the current level thus determined, by means of an analog comparator, is compared with the at least one current threshold value to the effect that, in the event of an overshoot by the current value of the value of the at least one current threshold value, the interruption of the current flux in the low-voltage circuit is initiated.

In this context, an overshoot by the current value of the at least one current threshold value is appropriately understood as an overshoot of the current threshold value, in the case of a positive current value, and as an undershoot of a (quantitatively equal) negative current threshold value, in the case of a negative current value (alternating current). This might also be achieved by means of a quantitative comparison.

This provides a particular advantage, in that a rapid prevention of a current flux (breaking), particularly by means of the electronic interruption unit, is achieved.

In an advantageous configuration of the invention, the circuit-breaker device is configured such that the at least one current threshold value is calculated digitally (by the control unit or, for example, by a microprocessor or microcontroller contained therein), wherein the calculated digital current threshold value is converted into an analog current threshold value by means of a digital-analog converter, and the analog current threshold value is fed to the comparator. This provides a particular advantage, in that the processing speed of an analog circuit (typically within the range of a few nanoseconds [ns], e.g. 5-10 ns, is combined with the flexibility of a digitally programmable and intelligent system (e.g. a microprocessor/microcontroller).

The analog comparator operates in a continuous-time manner, i.e. not in a discrete-time manner. Detection of an overcurrent (overshoot of a current threshold value) is thus possible within a very short time. A microprocessor/microcontroller functions as a discrete-time controller, such that the response time is limited to the duration of the processing cycle, which typically lies within a range of 10-100 μs.

By means of this combination, the flexibility and adaptability of a digital (instantaneous) current threshold value can be maintained, and the rapid response time of an analog circuit can simultaneously be achieved. This is possible on the grounds that there is no requirement for the adjustment of the current threshold value within the nanosecond/ns range, only for the execution of the comparison thereof with the (present) instantaneous current value within the ns range, which is possible by means of this arrangement/combination.

In an advantageous configuration of the invention, the circuit-breaker device is configured such that the temperature level is converted into a digital temperature value, the digital temperature value is multiplied by a factor, and the resulting product is subtracted from the at least one current threshold value, in order to obtain an adapted current threshold value.

This provides a particular advantage, in that a particularly simple calculation or adaptation of the current threshold value, according to the temperature level, is provided.

In an advantageous configuration of the invention, the circuit-breaker device is configured such that the temperature level is converted into a digital temperature value, the digital temperature value is reduced by an offset value, and the result is subtracted from the at least one current threshold value, in order to obtain an adapted current threshold value.

This provides a particular advantage, in that a further particularly simple calculation or adaptation of the current threshold value, according to the temperature level, is provided.

In an advantageous configuration of the invention, a voltage sensor unit is provided for determining the voltage level in the low-voltage circuit, such that instantaneous voltage values are available.

(Periodic) instantaneous current threshold values are further obtainable from the (periodic) time characteristic of the voltage level, i.e. from instantaneous voltage values.

Instantaneous current values are compared, in a phase-related manner, to the instantaneous current threshold values. In the event of a (quantitative) overshoot of the instantaneous current threshold value, an interruption of the low-voltage circuit is initiated.

This provides a particular advantage, in that threshold values/current threshold values which are dependent upon the periodicity of voltage are provided, in order to permit the achievement of a rapid current interruption (breaking), particularly by means of the electronic interruption unit. At low voltages, small current threshold values and, at high voltages, large current threshold values are employed.

In an advantageous configuration of the invention, the (periodic) instantaneous current threshold values assume a minimum value which is greater than zero. In particular, this minimum value is greater than 5%, 10%, 15% or 20%. Specifically, this value particularly lies within a range 5 to 20% of the maximum value, i.e. the maximum current threshold value.

This provides a particular advantage in that, at low current threshold value or low voltages, a secure and rapid detection of short-circuit currents is permitted, and any spurious tripping is prevented.

In an advantageous configuration of the invention, the low-voltage circuit assumes a sinusoidal temporal voltage characteristic (in an ideal case). In particular, the low-voltage circuit is a low-voltage AC circuit. Instantaneous current threshold values likewise assume, particularly quantitatively, a (near-) sinusoidal temporal current characteristic. In particular, the zero-crossing, or the region of the zero-crossing, assumes a (quantitative) minimum value which is greater than 5, 10, 15 or 20%, and particularly lies within a range of 5 to 20% of the maximum value, i.e. the maximum current threshold value. Temporal characteristics of the voltage and current threshold values are synchronized, in a phase-related manner, such that the time point of (maximum) voltage amplitude coincides with time point of the (maximum) amplitude of the current threshold value.

This provides a particular advantage, in that a simple detection (in particular) in sinusoidal voltage characteristics is permitted.

In particular, the region of the zero-crossing of voltage coincides with the region of the minimum current threshold value.

In an advantageous configuration of the invention, the circuit-breaker device is configured such that the control unit comprises an analog first subunit and a digital second subunit. The first subunit comprises an (analog) current comparator, to which instantaneous current values and instantaneous current threshold values are routed, the latter in particular from the second subunit. Current threshold values, according to the temporal voltage characteristic are delivered by the second subunit in a phase-related manner. A phase-related comparison of instantaneous current values with instantaneous current threshold values, on the basis of the temporal voltage characteristic, is permitted accordingly. An interruption of the low-voltage circuit, in the event of an overshoot of (instantaneous) current threshold values, can thus be initiated.

This provides the particular advantage of a simple implementation of the solution.

In an advantageous configuration of the invention, the circuit-breaker device is configured such that a grid synchronization unit is provided. From the instantaneous voltage values routed thereto, the latter determines at least one phase angle ($\varphi(t)$) of the voltage and, alternatively, the amplitude (U) of the voltage. A threshold value unit is provided, which is connected to the grid synchronization unit such that, from the phase angle ($\omega(t)$) of voltage, the amplitude (U) of voltage and a maximum limiting value/ threshold value for the current threshold value=>instantaneous current threshold values are determined. Instantaneous current values are compared, in a phase-related manner, with instantaneous current threshold values, in order to determine the initiation of a prevention of a current flux (interruption).

This provides the particular advantage of a further simple implementation of the solution.

Advantageously, an interruption of the current flux is primarily initiated by the electronic interruption unit. Additionally, or subject to the presence of further criteria, a galvanic interruption can be initiated by the mechanical break contact system.

According to the invention, a corresponding method is claimed for a circuit-breaker device for a low-voltage circuit having electronic (semiconductor-based) switching elements with the same and further advantages.

In a method for protecting an electric low-voltage circuit by means of a circuit-breaker device having a mechanical break contact unit, which is connected in series with an electronic interruption unit, wherein the mechanical break contact unit can be switched, by an opening of contacts, for the prevention of a current flux or, by the closing of contacts, for the conduction of a current flux in the low-voltage circuit, wherein the electronic interruption unit, by means of semiconductor-based switching elements, can be switched to a high-resistance state of the switching elements, for the prevention of a current flux, or to a low-resistance state of the switching elements, in order to permit a current flux in the low-voltage circuit, wherein the level of current in the low-voltage circuit is determined, such that instantaneous current values are in force wherein, in the event of an overshoot of the instantaneous current value, in comparison with at least one current threshold value, an interruption of the current flux in the low-voltage circuit is initiated, the at least one current threshold value is adapted in accordance with a level of the temperature in the circuit-breaker device.

In an advantageous configuration of the invention, the at least one current threshold value, according to a level of the temperature, is adapted such that, as the temperature increases, the at least one current threshold value is reduced and, as the temperature decreases, the at least one current threshold value is increased, particularly up to a maximum value of the at least one current threshold value.

According to the invention, a corresponding computer program product is claimed. The computer program product comprises commands which, upon the execution of the program by a microcontroller (microcomputer), initiates an improvement by the latter in the security of a circuit-breaker device of this type, or which permits the achievement of a higher degree of security in the low-voltage electric circuit which is to be protected by the circuit-breaker device, specifically wherein the electronic interruption unit executes a secure interruption of an electric current flux. The microcontroller (microprocessor) is an element of the circuit-breaker device, particularly of the control unit.

According to the invention, a corresponding computer-readable storage medium is claimed, on which the computer program product is saved.

According to the invention, a corresponding data transmission signal is claimed, which transmits the computer program product.

All configurations, both in the dependent form described with reference to the patent claims, and also with reference to only individual features or combinations of features from the patent claims, result in an improvement of a circuit-breaker device for rapid and secure breaking in response to overcurrents and short-circuits, and prevent any thermal destruction of semiconductor-based switching elements employed in response to overcurrents or short-circuits.

The properties, features and advantages of the invention described, and the manner in which these are achieved, will be clarified and rendered more comprehensible in conjunction with the following description of exemplary embodiments, which are described in greater detail with reference to the drawing.

DETAILED DESCRIPTION OF THE
INVENTION

Figure 1:
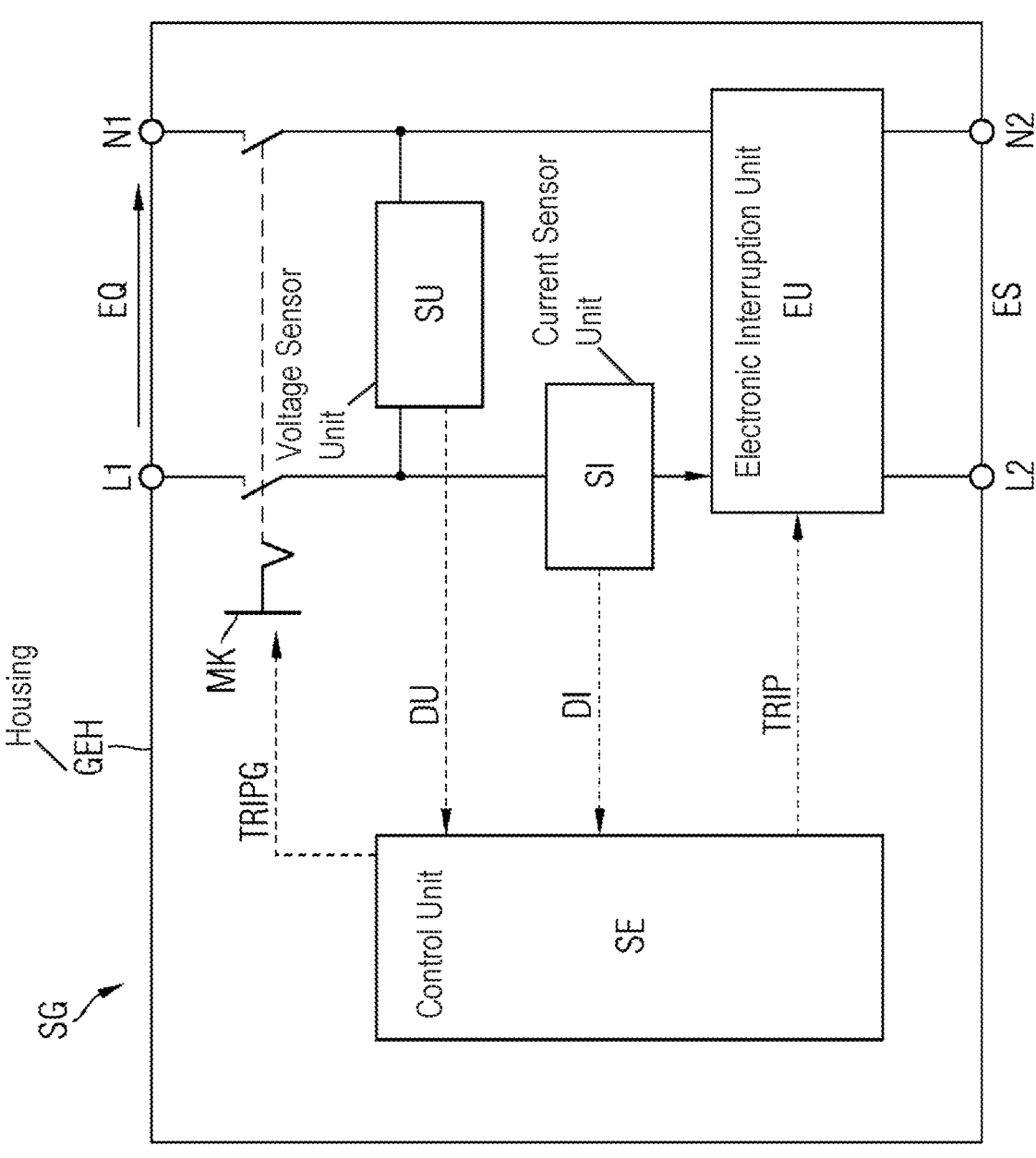
FIG. 1 shows a first representation of a circuit-breaker device.

FIG. 1 shows a representation of a circuit-breaker device
SG for protecting a low-voltage circuit, particularly a low-
voltage AC circuit, having a housing GEH and comprising:
    terminals for conductors of the low-voltage circuit, par-
    ticularly first terminals L1, N1 for a grid-side, particu-
    larly an energy source-side terminal EQ of the circuit-
    breaker device SG, and second terminals L2, N2 for a
    load-side, particularly for an energy sink-side—in the
    case of passive loads—terminal ES (load-side terminal)
    of the circuit-breaker device SG wherein, specifically,
    phase conductor-side terminals L1, L2 and neutral
    conductor-side terminals N1, N2 can be provided;
the load-side terminal can comprise a passive load (con-
sumer) and/or an active load (a (further) energy source), or
a load which can be both passive and active, e.g. in a
temporal sequence;
    a voltage sensor unit SU for determining the level of
    voltage in the low-voltage circuit, such that instanta-
    neous voltage values (phase-related voltage values) DU
    are provided;
    a current sensor unit SI for determining the level of
    current in the low-voltage circuit, such that instanta-
    neous (phase angle-related) current values DI are pro-
    vided;
    an electronic interruption unit EU which, by means of
    semiconductor-based switching elements, assumes a
    high-resistance state of switching elements for the
    prevention (particularly the interruption) and a low-
    resistance state of switching elements for the conduc-
    tion of a current flux in the low-voltage circuit;
    a mechanical break contact unit MK which, by means of
    an opening of contacts, is switchable for the prevention
    of a current flux or which, by means of a closing of
    contacts, is switchable for the conduction of a current
    flux in the low-voltage circuit;
    a control unit SE, which is connected to the voltage sensor
    unit SU, the current sensor unit SI, the mechanical
    break contact unit MK and the electronic interruption
    unit EU.
The mechanical break contact unit MK is electrically
connected in series with the electronic interruption unit EU.
The control unit SE:
    can be embodied in the form of a digital circuit, e.g.
    having a microprocessor; the microprocessor can also
    contain an analog element;
    can be embodied in the form of a digital circuit having
    analog circuit components.
The circuit-breaker device SG, particularly the control
unit SE, is configured such that, in the event of an overshoot
of at least one current threshold value, an interruption of a
current flux in the low-voltage circuit is initiated and,
particularly in a first step, is initiated by the electronic
interruption unit EU.
This means that, in the event of an overshoot of at least
one current threshold value which, in general, is caused by
a short-circuit, particularly a load-side (ES) short-circuit, the
electronic interruption unit EU is switched from the low-
resistance state to the high-resistance state, for the interrup-
tion of the low-voltage circuit.
The circuit-breaker device is configured such that the at
least one current threshold value is adapted according to the
level of a temperature of the circuit-breaker device.
This means that at least one current threshold value is
provided, upon the quantitative overshoot of which an interruption of a current flux in the low-voltage circuit is
initiated. This one current threshold value is then adapted
according to the level of temperature. A simple solution
according to the invention is thus provided.
A plurality of current threshold values can also be pro-
vided; in particular, instantaneous/phase angle-related cur-
rent threshold values can be provided such that, according to
the phase angle of the electric voltage or electric current, an
instantaneous or phase angle-related comparison is
executed. These instantaneous or phase angle-related current
threshold values can then be adapted, according to the level
of temperature. Particularly in a low-voltage AC circuit, an
adapted momentary or phase angle-related current threshold
value can then be made available in a rapid manner, for
example for the next half-wave (or a series of adapted
current threshold values for each half-wave—with an adap-
tation every 10 ms in a low voltage AC circuit having a
network frequency of 50 Hz).
A comparison can then be executed, to the effect that
(periodic) instantaneous current threshold values are avail-
able, which are dependent upon the (periodic) temporal
characteristic of the voltage level or upon the instantaneous
voltage values thus determined.
Instantaneous current threshold values can be provided
continuously, or in a phase angle-related manner.
Instantaneous current threshold values can thus be pro-
vided for each individual phase angle, for a phase angle
range (a plurality of phase angles), e.g. every 2°, or for a
phase angle segment (a proportion of a phase angle), e.g.
every 0.5° or 0.1°. In particular, a resolution of 1° to 5° is
particularly advantageous (this corresponds to a scanning
rate of 3.5 to 20 kHz).
Instantaneous current values are compared with instanta-
neous current threshold values in a phase-related manner. In
the event of a quantitative overshoot of the instantaneous
current threshold value, an interruption of the low-voltage
circuit is initiated, e.g. by means of a first interruption signal
TRIP, which is transmitted from the control unit SE to the
electronic interruption unit EU, as illustrated in FIG. 1.
The electronic interruption unit EU, according to FIG. 1,
is illustrated in the form of a block in both conductors. Thus,
according to a first variant, no interruption of both conduc-
tors is implied. At least one conductor, particularly the live
conductor or phase conductor, comprises semiconductor-
based switching elements. The neutral conductor can be free
of switching elements, i.e. can be configured with no semi-
conductor-based switching elements. This means that the
neutral conductor is directly connected, i.e. does not assume
a high-resistance state. This means that only a single-pole
interruption (of the phase conductor) is executed. If further
live conductors/phase conductors are provided, according to
a second variant of the electronic interruption unit EU, the
phase conductors comprise semiconductor-based switching
elements. The neutral conductor is directly connected, i.e.
does not assume a high-resistance state. This applies, for
example, to a three-phase AC circuit.
According to a third variant of the electronic interruption
unit EU, the neutral conductor can also comprise a semi-
conductor-based switching element, i.e. in the event of an
interruption of the electronic interruption unit EU, both
conductors assume a high-resistance state.
The electronic interruption unit EU can comprise semi-
conductor components such as bipolar transistors, field-
effect transistors (FETs), insulated-gate bipolar transistors
(IGBTs), metal oxide semiconductor field-effect transistors
(MOSFETs) or other (self-commutated) power semiconduc-
tors. IGBTs and MOSFETs, on the grounds of their low flow resistance, their high barrier resistance and effective switching performance are particularly appropriate for the circuit-breaker device according to the invention.

The circuit-breaker device SG can preferably comprise a standard mechanical break contact system MK with standard breaking properties, for the galvanic isolation of the circuit, particularly for the standard safety isolation (as opposed to breaking) of the circuit. The mechanical break contact system MK is connected to the control unit SE, as illustrated in FIG. 1, such that the control unit SE can initiate a galvanic isolation of the circuit.

Specifically, a further evaluation can be implemented which, in the event of the fulfilment of other criteria, initiates a galvanic isolation. For example, an overcurrent detection function can be provided, for example in the control unit SE which, in the event of overcurrents, i.e. upon the overshoot of a current/time limiting value, i.e. where a current which exceeds a current limiting value has been present for a specific time such that, for example, a specific energy threshold value is exceeded, executes a semiconductor-based and/or galvanic interruption of the circuit.

Alternatively or additionally, for example, in the event of the detection of a short-circuit, a galvanic isolation can also be initiated.

Initiation of the galvanic interruption of the low-voltage circuit is executed, for example, in response to a further second interruption signal TRIPG, which is transmitted from the control unit SE to the mechanical break contact system MK, as illustrated in FIG. 1.

According to a first variant, the mechanical break contact system MK can execute single-pole interruption. This means that only one conductor of the two conductors, particularly the live conductor or phase conductor, is interrupted, i.e. comprises a mechanical contact. In this case, the neutral conductor is contact-free, i.e. the neutral conductor is directly connected.

If further live conductors/phase conductors are provided, according to a second variant, the phase conductors comprise mechanical contacts of the mechanical break contact system. According to this second variant, the neutral conductor is directly connected. This applies, for example, to a three-phase AC circuit.

According to a third variant of the mechanical break contact system, the neutral conductor also comprises mechanical contacts, as illustrated in FIG. 1.

A mechanical break contact system MK is particularly to be understood as a (standard) breaking function, which is embodied by the break contact system MK. A breaking function implies the following features:

a minimum clearance as per standards (minimum contact gap), a contact setting indication function for the contacts of the mechanical break contact system, opening of the mechanical break contact system possible at all times (no blocking of the break contact system by manual action), or "trip-free operation".

With respect to the minimum clearance between the contacts of the break contact system, this is essentially voltage-dependent. Further parameters include the fouling factor, the type of field (uniform, non-uniform) and atmospheric pressure, or the value thereof above the datum level.

For these minimum clearances or creepage distances, corresponding regulations or standards apply. These regulations stipulate, for example, for a surge withstand capability in air, the minimum clearance for a non-uniform and uniform (ideal) electric field, according to the fouling factor. Surge withstand capability is the withstand in response to the application of a corresponding surge voltage. Only in the presence of this minimum gap (minimum clearance) will the break contact system or circuit-breaker device execute a breaking function (breaking property).

For the purposes of the invention, the breaking function and the properties thereof are governed by the standard series DIN EN 60947 or IEC 60947, to which reference is made in the present context.

The break contact system is advantageously characterized by a minimum clearance of the open breaking contacts in the OFF position (the open position, with the contacts opened), according to the surge withstand capability and the fouling factor. The minimum clearance, in particular, lies between (at least) 0.01 mm and 14 mm. In particular, the minimum clearance advantageously lies between 0.01 mm at 0.33 kV and 14 mm at 12 kV, particularly for a fouling factor of 1, and particularly for non-uniform fields.

The minimum clearance can advantageously assume the following values:

E DIN EN 60947-1 (VDE 0660-100): 2018-06

TABLE 13

| Minimum clearances | | | | | | | | |
|---|---|---|---|---|---|---|---|---|
| | Minimum clearances mm | | | | | | | |
| Design surge withstand capability $U_{imp}$ | Case A Non-uniform field (see 3.7.63) Fouling factor | | | | Case B Uniform field, ideal conditions (see 3.7.62) Fouling factor | | | |
| kV | 1 | 2 | 3 | 4 | 1 | 2 | 3 | 4 |
| 0.33 | 0.01 | | | | 0.01 | | | |
| 0.5 | 0.04 | 0.2 | 0.8 | | 0.04 | 0.2 | 0.8 | 1.6 |
| 0.8 | 0.1 | 0.5 | 1.5 | 1.6 | 0.1 | 0.3 | | |
| 1.5 | 0.5 | 1.5 | 3 | 3 | 0.3 | 0.6 | 1.2 | 2 |
| 2.5 | 1.5 | 3 | 5.5 | 5.5 | 0.6 | 1.2 | 2 | 3 |
| 4.0 | 3 | 5.5 | 8 | 8 | 1.2 | 2 | 3 | 4.5 |
| 6.0 | 5.5 | 8 | 14 | 14 | 2 | 3 | 4.5 | |
| 8.0 | 8 | 14 | | | 3 | 4.5 | | |
| 12 | 14 | | | | 4.5 | | | |

NOTE:
The minimum clearances indicated are based upon a 1.2/50-µs voltage surge at an atmospheric pressure of 80 kPa, which corresponds to atmospheric pressure at a height of 2,000 m above datum level.

Fouling factors and field types correspond to those defined in standards. Advantageously, a standard-compliant circuit-breaker device which is dimensioned in accordance with design surge withstand capability can thus be achieved.

Figure 2:
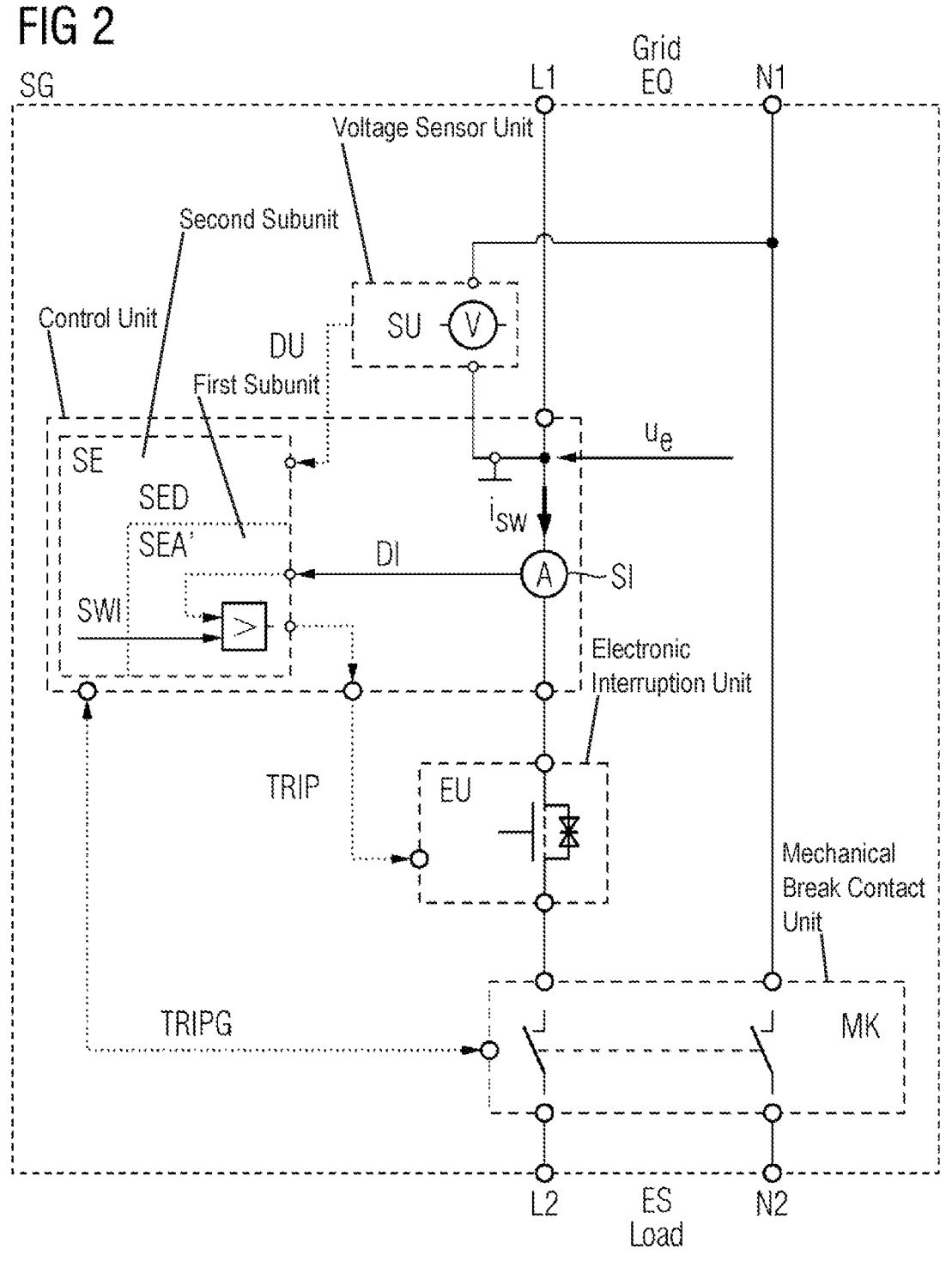
FIG. 2 shows a second representation of a circuit-breaker device.

FIG. 2 shows a representation according to FIG. 1, with the distinction that, advantageously (in the series circuit comprised of the mechanical break contact unit MK and the electronic interruption unit EU), the mechanical break contact unit MK is assigned to the load-side terminals and the electronic interruption unit EU is assigned to the grid-side terminals. The electronic interruption unit EU is further configured as a single-pole electronic interruption unit EU i.e., in the present example, is arranged in the phase conductor, i.e. between the terminals L1, L2. The electronic interruption unit EU further comprises (at least) one semiconductor-based switching element (power semiconductor), which is indicated in FIG. 2. The semiconductor-based switching element further comprises a voltage surge protection element, which is also indicated in FIG. 2. The control unit SE comprises an analog first subunit SEA and a digital second subunit SED. The digital second subunit SED can be, for example, a microprocessor or digital signal processor (DSP). The analog first subunit SEA comprises at least one (current) comparator, as indicated in FIG. 2.

Figure 3:
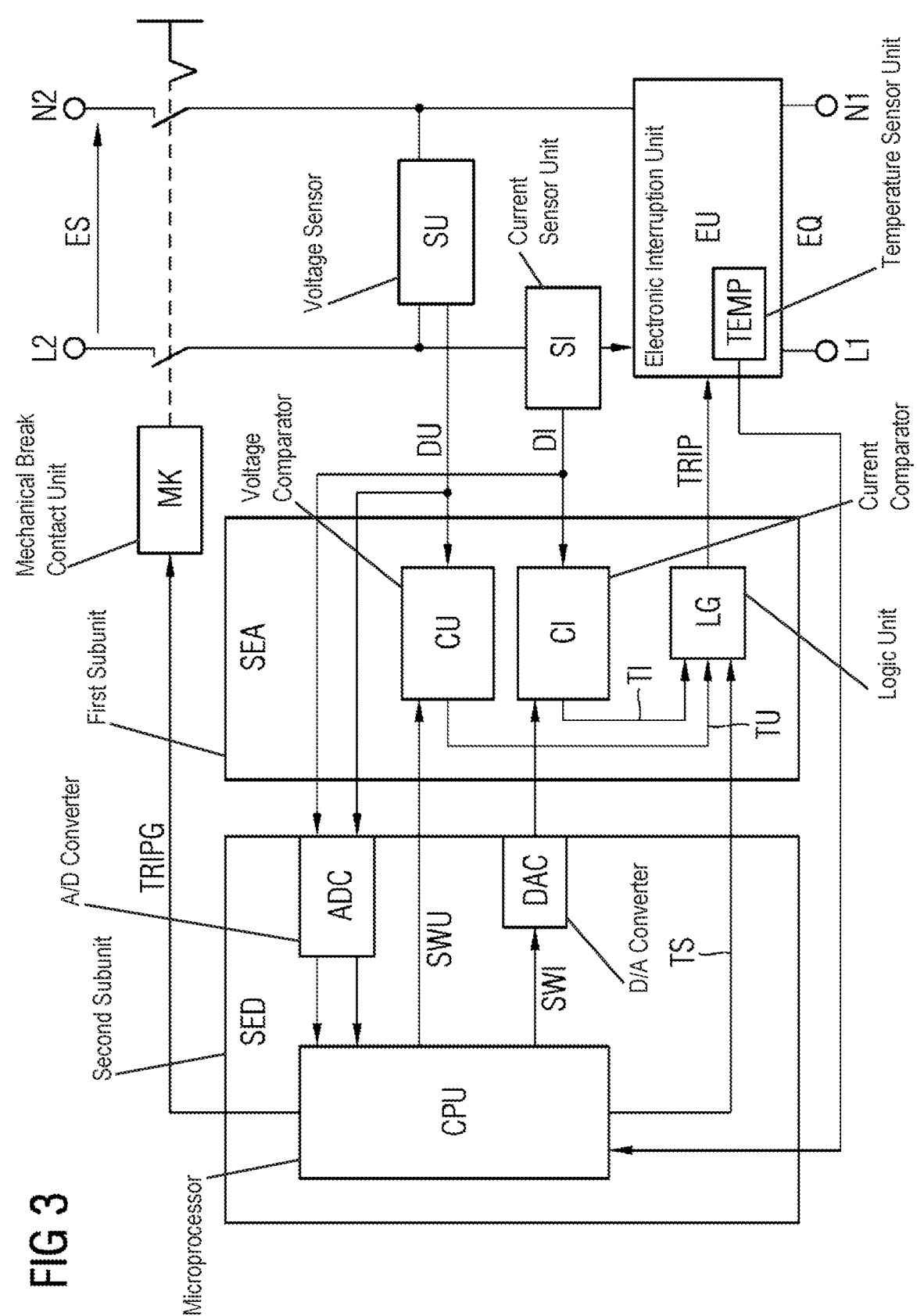
FIG. 3 shows a first configuration of the circuit-breaker device.

FIG. 3 shows a representation, according to FIGS. 1 and 2, of a further detailed configuration. The control unit SE comprises two subunits, one preferably analog first subunit SEA and one preferably digital second subunit SED. The first subunit SEA comprises an (analog) current comparator CI. Firstly, instantaneous current values DI from the current sensor unit SI are routed to the latter. Secondly, (in the present example, one current threshold value, or) instantaneous current threshold values SWI from the second subunit SED are routed to the current comparator CI. The current comparator CI compares instantaneous current values DI with instantaneous current threshold value SWI and, as described, in the event of a (particularly quantitative) overshoot, generates the output of a first current interruption signal TI, for the initiation of an interruption of the low-voltage circuit. The current interruption signal TI can be routed to a logic unit LG, which combines the latter with other interruption signals and delivers the first interruption signal TRIP for semiconductor-based interruption or high-resistance interruption to the electronic interruption unit EU. In one configuration, the current comparator CI saves the instantaneous (current) threshold values SWI, such that these values are available at all times.

The instantaneous current threshold values SWI are synchronized with the temporal characteristic of the instantaneous voltage values (the temporal voltage characteristic). Thus, in the case of a low instantaneous voltage (with a phase angle of a sinusoidal AC voltage of e.g. −30° to 0° to 30°), low instantaneous current threshold values SWI are employed (or are in force) whereas, in the case of a high instantaneous voltage (with a phase angle of a sinusoidal AC voltage of e.g. 60° to 90° to 120°), high current threshold values SWI are employed (or are in force). As a result, for example, advantageously, the release time is substantially independent of the phase angle of the voltage, such that the release time lies below a first temporal threshold value.

In the example according to FIG. 3, the electronic interruption unit EU comprises a temperature sensor unit TEMP, which comprises one or more temperature sensors. Further temperature sensor units can also be provided in other units or in the circuit-breaker device. The temperature sensor unit TEMP is connected to the control unit SE, in the present example to the second subunit SED which, in consideration of the temperature level or of a resulting temperature (in the case of multiple temperature sensors or temperature sensor units), executes an adaptation of the level of the at least one current threshold value.

Instantaneous current values DI are, moreover, routed to the second subunit SED. In a preferred configuration, the instantaneous current values DI are digitized herein by means of an analog-digital converter ADC, and are fed to a microprocessor CPU. This will result in a determination or calculation of instantaneous current threshold values SWI, specifically according to the level of temperature, executed by the temperature sensor unit TEMP and/or by a calculation of the level of temperature from the level of current/instantaneous current values. Instantaneous current values SWI determined by the second subunit SED, particularly by the microprocessor CPU, in turn, are routed to the first subunit SEA, particularly to the current comparator CI, in order to execute the above-mentioned comparison.

The second subunit SED or the first subunit SEA can comprise a digital-analog converter DAC, in order to convert (digital) current threshold values SWI calculated in the second subunit SED into analog current threshold values SWI, for the purposes of the execution of an analog comparison in the analog first subunit SEA. In the example according to FIG. 3, the digital-analog converter DAC is an element of the (digital) second subunit SED (or is assigned to the latter).

Advantageously, the determination of instantaneous current threshold values SWI can thus be executed digitally in the second subunit SED, or can be executed at a slower processing speed than the progressive comparison of instantaneous current values DI with instantaneous current threshold values SWI in the first subunit SEA.

In an advantageous configuration of the invention, the first subunit SEA can comprise a voltage comparator CU. Instantaneous voltage values DU from the voltage sensor SU, firstly, are routed to the latter. Secondly, instantaneous voltage threshold values SWU are routed from the second subunit SED to the voltage comparator CU.

The voltage comparator CU compares instantaneous voltage values DU with instantaneous voltage threshold values SWU and, in the event of an overshoot or undershoot, or upon the execution of a range check, delivers an output of a voltage interruption signal TU for the initiation of an interruption of the low-voltage circuit.

The voltage interruption signal TU can be routed to the logic unit LG, where it is combined with other interruption signal(s), and the output of a first interruption signal TRIP for the semiconductor-based interruption or high-resistance interruption is delivered to the electronic interruption unit EU.

In one configuration, the voltage comparator CU saves instantaneous threshold values SWU, such that these values are available at all times.

In this configuration, moreover, instantaneous voltage values DU can be routed to the second subunit SED. In a further preferred configuration, instantaneous voltage values DU are digitized herein by the analog-digital converter ADC and are routed to the microprocessor CPU. This executes a determination or calculation of instantaneous voltage threshold values SWU. Instantaneous voltage threshold values SWU determined by the second subunit SED, or particularly by the microprocessor CPU, in turn, are routed to the first subunit SEA, particularly to the voltage comparator CU, for the purposes of the execution of the above-mentioned comparison.

Advantageously, determination of instantaneous voltage threshold values SWU can thus be executed digitally in the second subunit SED, or can be executed at a slower processing speed than the progressive comparison of instantaneous voltage values DU and instantaneous voltage threshold values SWU in the first subunit SEA.

Depending upon the configuration, the output of a second interruption signal TRIPG can be delivered by the second subunit SED of the control unit SE, particularly by the microprocessor CPU, for the galvanic interruption of the low-voltage circuit at the mechanical break contact system MK, as illustrated in FIG. 3.

The configuration of the control unit with an analog first subunit and a digital second subunit provides a particular advantage, in that an efficient architecture is thus provided. The first analog subunit can execute a very rapid comparison of instantaneous values and threshold values, as a result of which rapid short-circuit detection is possible. The second subunit can execute a threshold value calculation or adaptation which is independent thereof, according to the invention, in accordance with the level of temperature, the execution of which is not required as rapidly as the detection function. Threshold values, for example, can be stored such that they are available for rapid comparison. It is not necessary for threshold values to be continuously adapted.

Figure 4:
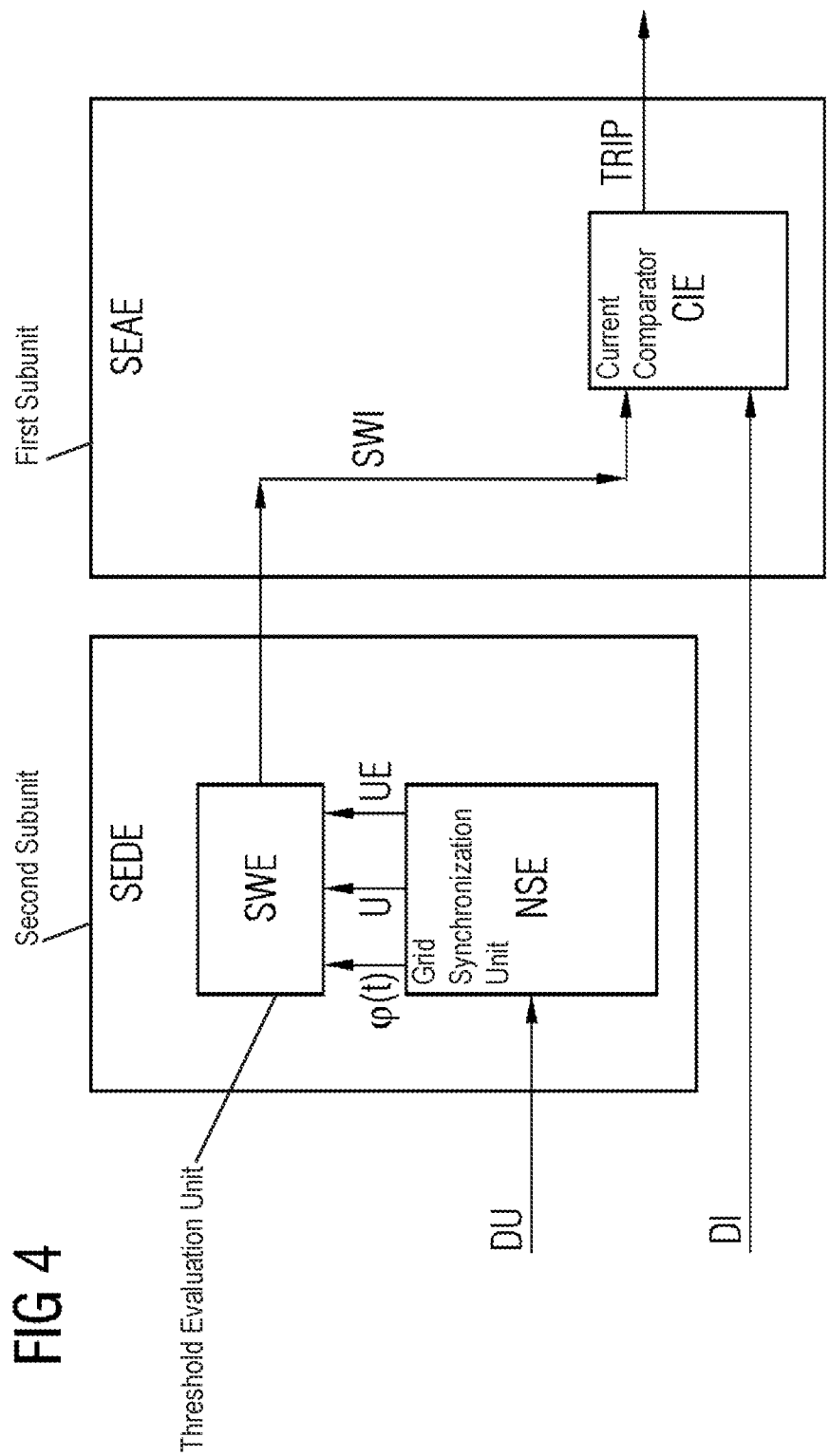
FIG. 4 shows a second configuration of the circuit-breaker device.

FIG. 4 shows a further configuration or variant according to FIGS. 1 to 3. FIG. 4 shows part of simple variant of the preferably analog first subunit SEAE, and part of an alternative variant of the preferably digital second subunit SEDE.

Part of the simple variant of the first subunit SEAE comprises the current comparator CIE, to which instantaneous current values DI, particularly the quantitative amount thereof, and instantaneous current threshold values SWI which, in particular, are also quantity-related, are routed. In the present example, the current comparator CIE delivers a direct output of the first interruption signal TRIP for interrupting the low-voltage circuit, in an analogous manner to the preceding figures. Absolute-value generation can be executed by one, or by further unrepresented units. Part of the alternative variant of the second subunit SEDE comprises a grid synchronization unit NSE. (Analogue) instantaneous voltage values DU are routed to the latter. The grid synchronization unit NSE determines the phase angle $\omega(t)$ of voltage from (analog) instantaneous voltage values DU which are routed thereto, which represent e.g. a sinusoidal AC voltage of the low-voltage circuit.

Alternatively, the amplitude U and an anticipated time value of voltage UE, or a respective anticipated value of voltage UE, can additionally be determined.

The anticipated value of voltage UE is a form of filtered, or regenerated, or generated equivalent instantaneous voltage value DU.

The phase angle $\omega(t)$ (and the anticipated value of voltage UE, or the amplitude U) of the voltage DU can be determined, for example, by means of a "phase-locked loop", or PLL for short. A PLL is an electronic circuit assembly which influences the phase angle, and thus, in an associated manner, the frequency of a variable oscillator by means of a closed control loop, such that the phase deviation between an external periodic reference signal (instantaneous voltage values) and the oscillator, or a signal which is derived therefrom, is maintained as constant as possible.

Thus, inter alia, the phase angle $\omega(t)$, the fundamental frequency and amplitude of the grid voltage which is routed thereto, i.e. the determined voltage values, can be determined, e.g. including the (undisturbed or filtered) anticipated value of the (grid) voltage.

The phase angle $\omega(t)$ determined by the grid synchronization unit NSE (and, optionally, the amplitude U and/or the anticipated time value of voltage UE) are routed to a threshold evaluation unit SWE. The threshold evaluation unit SWE can comprise a (scaled) curve for the (phase-related) instantaneous current threshold values SWI. For example, in the case of a sinusoidal AC voltage of the low-voltage circuit, this is an (approximately) sinusoidal current threshold value curve, i.e. a quantitative sinusoidal characteristic of instantaneous current threshold values SWI through a phase angle of 0° to 360°, or of the cycle time (or of the (corresponding) time).

The circuit-breaker device SG can comprise particularly a single adjusting element. By means of this, particularly single adjusting element on the circuit-breaker device SG, a limiting value or maximum value for the current threshold value can be adjusted. Alternatively, the limiting value or maximum value of the current threshold value can also be defined or programmed as a fixed value. According to the invention, the current threshold value curve, with respect to the limiting value or maximum value which is set by means of the adjusting element or which is defined in a fixed manner, is scaled to the current threshold value. For example, the amplitude (i.e. the maximum value) of the current threshold value curve can be scaled to the limiting value/maximum value of the current threshold value.

For example, the current threshold value can be 16 A.

Instantaneous current threshold values SWI, as a result of the presence of the phase angle $\varphi(t)$ of voltage in the threshold evaluation unit SWE, can be communicated by the latter, synchronously with the instantaneous current value DI, to the current comparator CIE, such that a phase-related (phase angle-related) comparison between the instantaneous current value DI and the instantaneous current threshold value can be executed.

Figure 5:
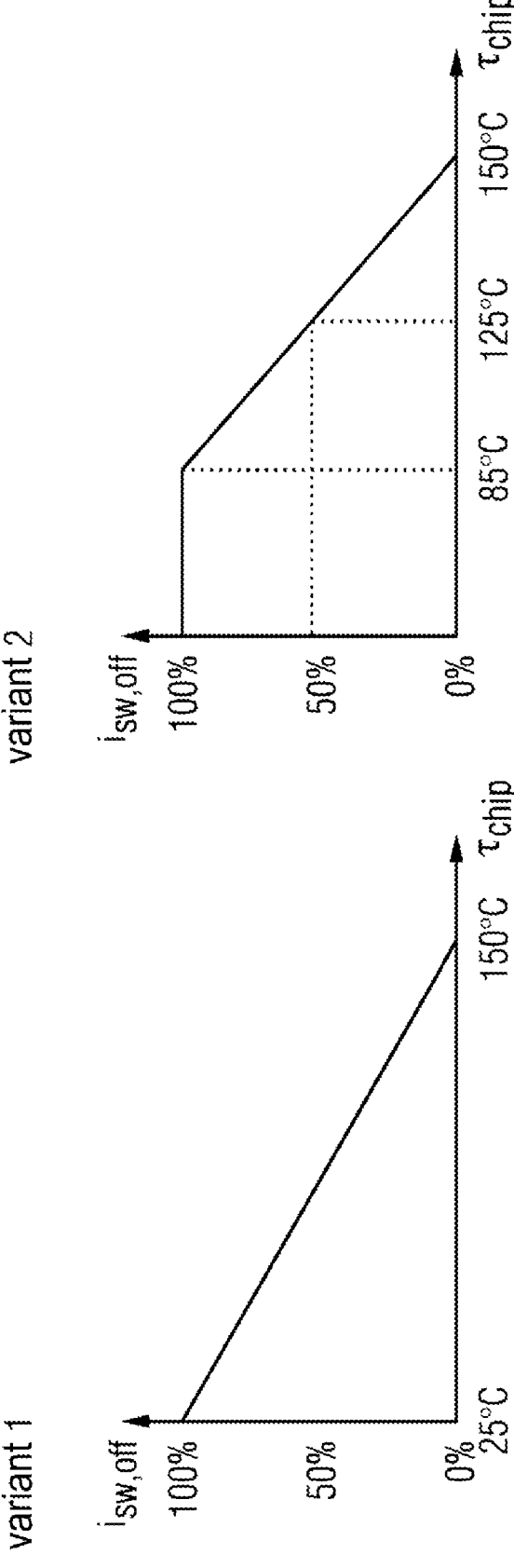
FIG. 5 shows current threshold value characteristics plotted against time.

FIG. 5 shows, on the left-hand side, a variant 1 of an exemplary characteristic of the relative level of a current threshold value $i_{sw.off}$, plotted as a percentage % on the vertical axis against a temperature $\tau_{chip}$, which is plotted in degrees Celsius ° C. on the horizontal axis. For example, at 25° or under, the relative current threshold value is 100%, i.e. at the maximum value of the at least one current threshold value. At 150° C., the relative current threshold value is 0%, i.e. lies at 0 amperes such that, in the event of a current flux, an immediate interruption of the low-voltage circuit is executed.

Within a given temperature range, the relative current threshold value declines in a linear manner as the temperature rises. This means that, as the temperature rises, the at least one current threshold value reduces. If the temperature falls again, the (relative) current threshold value rises again. This means that, as the temperature falls, the at least one current threshold value rises. On the right-hand side of FIG. 5, variant 2 represents a further exemplary characteristic of the relative level of a current threshold value $i_{sw.off}$, plotted as a percentage % on the vertical axis against a temperature $\tau_{chip}$, which is plotted in degrees Celsius ° C. on the horizontal axis. In the present example, the relative current threshold value is 100%, up to a temperature of 85° C., i.e. at the maximum value of the at least one current threshold value. At 150° C., the relative current threshold value is restored to 0%. At 125° C., the relative current threshold value is 50%.

The level of the temperature can be the level of temperature within the housing of the circuit-breaker device. Specifically, the level of the temperature can be the temperature level of the electronic interruption unit EU. In particular, the level of temperature can be the level of the temperature of a semiconductor-based switching element (particularly a power semiconductor) of the electronic interruption unit EU. The temperature of further power semiconductors can also be determined. From the temperatures thus determined, a relevant temperature can be defined, which is employed as the level of temperature of the circuit-breaker device, in order to permit the adaptation of the level of the at least one current threshold value, for example for the relative adaptation thereof.

Corresponding temperature sensor units are arranged at corresponding locations, according to the configuration.

In one advantageous configuration of the invention, the circuit-breaker device is configured such the level of temperature is determined from a temperature sensor which is contained in the device, and the temperature thereof thus determined and the level of the measured current are established such that a calculation is executed by the application of an electrical model and a thermal model, in consideration of the level of the instantaneous value of current.

From a simple electrical model of the semiconductor-based switching elements/power semiconductor(s) (the electrical resistance thereof in the switched-on state) and the instantaneous value of the measured current, the instantaneous value of the resulting power loss in the semiconductor can be calculated or estimated. Additionally, a temperature sensor/temperature sensor unit containing the latter determines e.g. the temperature of the existing heat sink of the electronic interruption unit or of the semiconductor-based switching elements (power semiconductors).

By means of these two elements of information (instantaneous value of losses in the power semiconductors, temperature in the device (preferably at a specific location in the thermal cooling chain, e.g. on the heat sink)) and a thermal model of the cooling chain (semiconductor chip→semiconductor housing→heat sink→environment), the instantaneous temporal value of the semiconductor chip temperature can be calculated.

This provides a particular advantage, in that thermal inertia associated with a thermal measurement executed by a temperature sensor unit does not result in any delay in the temperature characteristic of the power semiconductor (semiconductor-based switching elements) thus determined.

The speed of determination of the temperature of semiconductor-based switching elements/semiconductor temperature is then dictated by the rate of scanning of the current/current value and the calculation time in the corresponding control unit/microcontroller. These times typically lie within the range of e.g. 10 μs to 500 μs.

This rapid calculation of temperature thus provides critical protection against any thermal overloading of the constituent power semiconductor, and consequently enhances the robustness, and thus the security of the electronic circuit-breaker and switching device.

(Any direct thermal measurement at this speed is not possible).

The level of the at least one current threshold value is advantageously adapted by the control unit. The circuit-breaker device is configured, for example, such that the control unit adapts the at least one current threshold value (for the prevention of any current flux in the low-voltage circuit, according to the level of a temperature of the circuit-breaker device.

Adaptation of the at least one current threshold value according to the level of a temperature of the circuit-breaker device is executed, for example, by means of a calculation. In the example according to variant 1, calculation of the current threshold value according to the level of temperature $i_{sw,off}(\tau_{chip})$ is executed as follows:

$$i_{sw,off}(\tau_{chip})=isw,off(\tau chip)=\text{Current threshold value}$$
according to the level of temperature $$I_{sw,off}=Isw,off=\text{Maximum value of current threshold}$$
value $$\tau_{chip}=\tau chip=(\text{Relevant})\text{temperature}$$

$$isw,\,off(\tau chip) = Isw,\,off*\left(1 - \frac{(\tau chip - 25°\ C.)}{125°\ C.}\right)$$

On condition that:

$$i_{sw,off}(\tau_{chip})=I_{sw,off}*[0 \ldots 100\%]$$

With respect to variant 2 according to FIG. 5, the following applies in an analogous manner:

$$isw,\,off(\tau chip) = Isw,\,off*\left(1 - \frac{(\tau chip - 85°\ C.)}{65°\ C.}\right)$$

Again on condition that:

$$i_{sw,off}(\tau_{chip})=I_{sw,off}*[0 \ldots 100\%]$$

Figure 6:
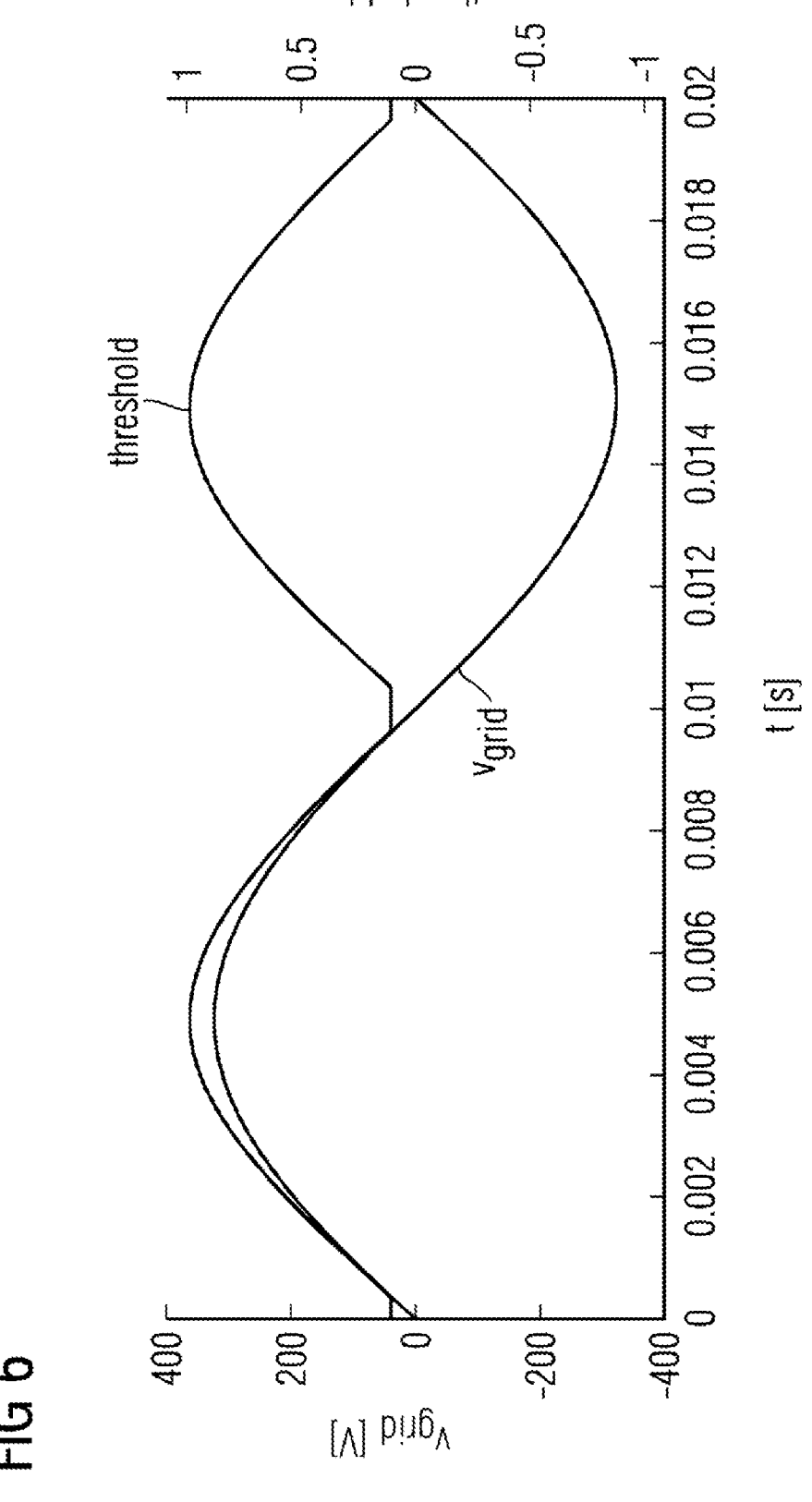
FIG. 6 shows voltage and current threshold value characteristics plotted against time.

FIG. 6 shows, firstly, a characteristic for the value of grid-side voltage $V_{grid}$ in volts [V], plotted on the left-hand vertical axis, and a cycle of a sinusoidal AC voltage over time t in s [s], plotted on the horizontal axis. This represents, for example, a sinusoidal AC voltage in the low-voltage circuit. Instantaneous voltage values of the voltage are plotted against time, wherein time is proportional to the phase angle (f=50 Hz].

Secondly, a phase angle-related or phase angle-dependent (quantitatively) scaled (from 0 to 1) instantaneous current threshold value "threshold" is plotted against time in s [s] on the right-hand vertical axis. The temporal (scaled characteristic of the instantaneous current threshold value "threshold" corresponds to the (phase-related) instantaneous current threshold values SWI.

The temporal (scaled) characteristic of instantaneous current threshold values "threshold" is scaled according to the limiting value/maximum value for the current threshold value which is adjusted by means of the adjusting element, or is defined in a fixed manner, according to the invention. For example, the amplitude (by a scaling of 1) is set to 100 A, or e.g. 5 times the nominal current. At a rated current of e.g. 16 A, this gives e.g.:

$$5*16A*1.414(\text{root } 2)=113A$$

(root 2)=>peak value of the instantaneous current value).

In general, the characteristic of instantaneous current threshold values "threshold" corresponds to the voltage characteristic in the circuit, as represented in FIG. 6. This means that, for example, in the case of a triangular voltage characteristic, a triangular current threshold value curve would be employed. To place this in context, the level of voltage determines the level of the (short-circuit) current. According to the invention, in consequence, low threshold values are employed at a low voltage, and high threshold values are employed at a high voltage, in order to permit a rapid and phase angle-independent short-circuit detection, which is adapted in a temperature-related manner.

According to FIG. 6, the (periodic) instantaneous current threshold values SWI assume a minimum value. This means that the sine curve is not ideal (but represents an approximation only, or is near-sinusoidal). The minimum value is greater than zero. The minimum value is greater than 5%, 10%, 15% or 20%, and particularly lies within the range of 5 to 20% of the maximum value, for example 10% or 15%, i.e. of the amplitude of the current threshold value curve "threshold".

The minimum value occurs at the location or in the region of the zero-crossing of the (sine) curve for current threshold values.

In the case of a sinusoidal temporal voltage characteristic of the low-voltage circuit, the temporal characteristics of voltage and current threshold values are synchronized in a phase-related manner, such that the time point of the amplitude (maximum value) of voltage coincides with the time point of the amplitude (maximum value) of the current threshold value, as represented in FIG. 6. The region of the voltage zero-crossing, moreover, coincides with the region of the minimum value of the current threshold value.

The speed of calculation of threshold values is dictated by phase angle resolution. At a phase angle resolution of 1°, i.e. for each full phase angle of voltage, a threshold value is provided, i.e. an instantaneous threshold value is provided approximately every 55.5 μs. Breaking is preferably executed by means of an analog comparator, i.e. in a continuous manner, and is thus significantly more rapid than phase angle resolution (e.g. in the nanosecond range).

Alternatively, in the case of fully-digital processing, the following temporal characteristic applies. Speed of detection is dictated by phase angle resolution. At a phase angle resolution of 1°, i.e. for each full phase angle of voltage, a threshold value is provided, i.e. an instantaneous threshold value is provided approximately every 55.5 μs, such that breaking can only be executed after a minimum of approximately 60 μs. At higher phase angle resolutions, shorter breaking times can be achieved.

In the present example, processing is then executed for values of at least 18 kHz.

(Scaled) current threshold values can also be saved in a table, wherein the value can then be adapted, where applicable.

Although the invention has been illustrated and described in greater detail with reference to the exemplary embodiment, the invention is not limited to the examples disclosed, and further variations can be inferred herefrom by a person skilled in the art, without departing from the protective scope of the invention.

The invention claimed is:

1. A circuit-breaker device for protecting a low-voltage electric circuit, the circuit-breaker device comprising:
   a housing having first and second terminals for conductors of the low-voltage circuit;
   a series-connected arrangement of a mechanical break contact unit and an electronic interruption unit, for an electrical connection of said first and second terminals;
   said mechanical break contact unit having contacts and being switchable by opening said contacts for interrupting a current flux or by closing said contacts for conduction of a current flux in the low-voltage circuit;
   said electronic interruption unit having semiconductor-based switching elements and being switchable to a high-resistance state of said switching elements for prevention of a current flux or to a low-resistance state of said switching elements for allowance of a current flux in the low-voltage circuit;
   a current sensor unit for determining a current level in the low-voltage circuit and making instantaneous current values available, at least one current limiting value being continuously adapted;
   a control unit connected to said current sensor unit, to said mechanical break contact unit and to said electronic interruption unit, for initiating prevention of a current flux in the low-voltage circuit in an event of overshooting at least one current threshold value; and
   the circuit-breaker device being configured to adjust the at least one current threshold value according to a temperature level of the circuit-breaker device.

2. The circuit-breaker device according to claim 1, wherein said first terminals are grid-side terminals, said second terminals are load-side terminals, said mechanical break contact unit is associated with said load-side terminals, and said electronic interruption unit is associated with the grid-side terminals.

3. The circuit-breaker device according to claim 1, wherein the at least one current threshold value is adapted to the temperature level by causing the at least one current threshold value to be reduced as the temperature rises, and by causing the at least one current threshold value to be increased as the temperature falls.

4. The circuit-breaker device according to claim 3, wherein the at least one current threshold value is increased up to a maximum value of the at least one current threshold value.

5. The circuit-breaker device according to claim 1, wherein the temperature level of the circuit-breaker device is a temperature level within said housing of the circuit-breaker device.

6. The circuit-breaker device according to claim 1, wherein the temperature level of the circuit-breaker device is a temperature level of the electronic interruption unit.

7. The circuit-breaker device according to claim 1, wherein the temperature level of the circuit-breaker device is a temperature level of one of said semiconductor-based switching elements of said electronic interruption unit.

8. The circuit-breaker device according to claim 1, which further comprises at least one temperature sensor unit connected to said control unit to determine the temperature level.

9. The circuit-breaker device according to claim 1, wherein the temperature level is determined or calculated from a measured current level.

10. The circuit-breaker device according to claim 8, wherein the temperature level is determined from the measured current level by executing a calculation involving an electrical model and a thermal model in consideration of an instantaneous current value level.

11. The circuit-breaker device according to claim 1, wherein the at least one current limiting value is continuously adapted within a time of less than 20 ms.

12. The circuit-breaker device according to claim 1, wherein the at least one current limiting value is continuously adapted within a time of less than 10 ms.

13. The circuit-breaker device according to claim 1, wherein the at least one current limiting value is continuously adapted within a time of less than 1 ms.

14. The circuit-breaker device according to claim 1, which further comprises an analog comparator comparing the instantaneous current value of the current level with the at least one current threshold value, and initiating the interruption of the current flux in the low-voltage circuit in an event of an overshoot by the current value of the value of the at least one current threshold value.

15. The circuit-breaker device according to claim 1, which further comprises a digital-analog converter and a comparator, the at least one current threshold value being calculated digitally, said digital-analog converter converting the calculated digital current threshold value into an analog current threshold value, and the analog current threshold value being fed to said comparator.

16. A circuit-breaker device for protecting a low-voltage electric circuit, the circuit-breaker device comprising:
   a housing having first and second terminals for conductors of the low-voltage circuit;
   a series-connected arrangement of a mechanical break contact unit and an electronic interruption unit, for an electrical connection of said first and second terminals;
   said mechanical break contact unit having contacts and being switchable by opening said contacts for interrupting a current flux or by closing said contacts for conduction of a current flux in the low-voltage circuit;
   said electronic interruption unit having semiconductor-based switching elements and being switchable to a high-resistance state of said switching elements for prevention of a current flux or to a low-resistance state of said switching elements for allowance of a current flux in the low-voltage circuit;

a current sensor unit for determining a current level in the low-voltage circuit and making instantaneous current values available;

a control unit connected to said current sensor unit, to said mechanical break contact unit and to said electronic interruption unit, for initiating prevention of a current flux in the low-voltage circuit in an event of overshooting at least one current threshold value; and the circuit-breaker device being configured to adjust the at least one current threshold value according to a temperature level of the circuit-breaker device;

the temperature level being converted into a digital temperature value, the digital temperature value being multiplied by a factor, and a resulting product being subtracted from the at least one current threshold value, to obtain an adapted current threshold value.

17. A circuit-breaker device for protecting a low-voltage electric circuit, the circuit-breaker device comprising:

a housing having first and second terminals for conductors of the low-voltage circuit;

a series-connected arrangement of a mechanical break contact unit and an electronic interruption unit, for an electrical connection of said first and second terminals;

said mechanical break contact unit having contacts and being switchable by opening said contacts for interrupting a current flux or by closing said contacts for conduction of a current flux in the low-voltage circuit;

said electronic interruption unit having semiconductor-based switching elements and being switchable to a high-resistance state of said switching elements for prevention of a current flux or to a low-resistance state of said switching elements for allowance of a current flux in the low-voltage circuit;

a current sensor unit for determining a current level in the low-voltage circuit and making instantaneous current values available;

a control unit connected to said current sensor unit, to said mechanical break contact unit and to said electronic interruption unit, for initiating prevention of a current flux in the low-voltage circuit in an event of overshooting at least one current threshold value; and the circuit-breaker device being configured to adjust the at least one current threshold value according to a temperature level of the circuit-breaker device;

the temperature level being converted into a digital temperature value, the digital temperature value being reduced by an offset value, and a result being subtracted from the at least one current threshold value, to obtain an adapted current threshold value.

18. A circuit-breaker device for protecting a low-voltage electric circuit, the circuit-breaker device comprising:

a housing having first and second terminals for conductors of the low-voltage circuit;

a series-connected arrangement of a mechanical break contact unit and an electronic interruption unit, for an electrical connection of said first and second terminals;

said mechanical break contact unit having contacts and being switchable by opening said contacts for interrupting a current flux or by closing said contacts for conduction of a current flux in the low-voltage circuit;

said electronic interruption unit having semiconductor-based switching elements and being switchable to a high-resistance state of said switching elements for prevention of a current flux or to a low-resistance state of said switching elements for allowance of a current flux in the low-voltage circuit;

a current sensor unit for determining a current level in the low-voltage circuit and making instantaneous current values available;

a control unit connected to said current sensor unit, to said mechanical break contact unit and to said electronic interruption unit, for initiating prevention of a current flux in the low-voltage circuit in an event of overshooting at least one current threshold value;

the circuit-breaker device being configured to adjust the at least one current threshold value according to a temperature level of the circuit-breaker device;

a voltage sensor unit for determining a voltage level in the low-voltage circuit and making instantaneous voltage values available;

periodic instantaneous current threshold values being obtained and being dependent upon a periodic temporal characteristic of instantaneous voltage values; and instantaneous current values being compared, in a phase-related manner, to the instantaneous current threshold values, for initiating an interruption of the low-voltage circuit in an event of a quantitative overshoot of the value of the instantaneous current threshold value.

19. The circuit-breaker device according to claim 18, wherein:

the low-voltage circuit assumes a sinusoidal temporal voltage characteristic;

the instantaneous current threshold values assume, quantitatively, a near-sinusoidal temporal current threshold value characteristic, having a minimum value greater than zero; and the temporal characteristics of voltage and current threshold values are synchronized in a phase-related manner, causing a time point of the amplitude of the voltage to coincide with a time point of the amplitude of the current threshold value.

20. The circuit-breaker device according to claim 19, wherein the minimum value is greater than 5% of a maximum value.

21. The circuit-breaker device according to claim 19, wherein the minimum value is greater than 10% of a maximum value.

22. The circuit-breaker device according to claim 19, wherein the minimum value is greater than 15% of a maximum value.

23. The circuit-breaker device according to claim 19, wherein the minimum value is greater than 20% of a maximum value.

24. The circuit-breaker device according to claim 19, wherein a region of a zero-crossing of the voltage coincides with a region of the minimum current threshold value.

25. The circuit-breaker device according to claim 1, wherein said control unit adapts the at least one current threshold value for prevention of any current flux in the low-voltage circuit, according to the temperature level of the circuit-breaker device.

26. A non-transitory computer program product having commands stored thereon which, upon execution of the program by a microcontroller, use the circuit-breaker device according to claim 1 to initiate an execution of a method for protecting the low-voltage electric circuit.

27. A non-transitory computer-readable storage medium, on which the computer program product according to claim 26 is saved.

28. A method for transmitting a computer program, the method comprising transmitting the program stored on the non-transitory computer program product according to claim 27 on a data transmission signal.

* * * * *